(12) United States Patent
Arimitsu et al.

(10) Patent No.: US 11,180,579 B2
(45) Date of Patent: Nov. 23, 2021

(54) ACTIVE ENERGY RAY-CURABLE COMPOSITION

(71) Applicants: TOKYO UNIVERSITY OF SCIENCE FOUNDATION, Tokyo (JP); TOAGOSEI CO., LTD., Tokyo (JP)

(72) Inventors: Koji Arimitsu, Tokyo (JP); Kento Oomura, Nagoya (JP)

(73) Assignees: TOKYO UNIVERSITY OF SCIENCE FOUNDATION, Tokyo (JP); TOAGOSEI CO., LTD., Tokyo (JP)

(*) Notice: Subject to any disclaimer, the term of this patent is extended or adjusted under 35 U.S.C. 154(b) by 0 days.

(21) Appl. No.: 16/771,453

(22) PCT Filed: Nov. 30, 2018

(86) PCT No.: PCT/JP2018/044205
§ 371 (c)(1),
(2) Date: Jun. 10, 2020

(87) PCT Pub. No.: WO2019/116931
PCT Pub. Date: Jun. 20, 2019

(65) Prior Publication Data
US 2021/0070893 A1    Mar. 11, 2021

(30) Foreign Application Priority Data

Dec. 12, 2017    (JP) .............................. JP2017-237839
Apr. 27, 2018    (JP) .............................. JP2018-086861

(51) Int. Cl.
| | |
|---|---|
| *C08F 2/46* | (2006.01) |
| *C08F 2/50* | (2006.01) |
| *C08G 61/04* | (2006.01) |
| *C09D 7/63* | (2018.01) |
| *C08F 20/26* | (2006.01) |
| *C09D 4/00* | (2006.01) |
| *C09D 11/101* | (2014.01) |

(Continued)

(52) U.S. Cl.
CPC ............... *C08F 2/46* (2013.01); *C08F 20/26* (2013.01); *C09D 4/00* (2013.01); *C09D 7/63* (2018.01); *C09D 11/101* (2013.01); *C09J 4/00* (2013.01); *C09J 11/06* (2013.01)

(58) Field of Classification Search
CPC . C09D 4/00; C09D 7/63; C09D 11/101; C09J 11/06; C09J 4/00; C08F 20/26; C08F 2/46; C09K 3/00
USPC .................. 522/182, 178, 1; 520/1
See application file for complete search history.

(56) References Cited

U.S. PATENT DOCUMENTS

| | | | |
|---|---|---|---|
| 8,853,292 B2 | 10/2014 | Noguchi et al. | |
| 10,197,913 B2 | 2/2019 | Arimitsu et al. | |

(Continued)

FOREIGN PATENT DOCUMENTS

| | | |
|---|---|---|
| JP | 2011-80032 A | 4/2011 |
| JP | 2012-250969 A | 12/2012 |

(Continued)

OTHER PUBLICATIONS

Arimitsu, JP 2018-131593 Machine Translation, Aug. 23, 2018 (Year: 2018).*

(Continued)

*Primary Examiner* — Jessica Whiteley
(74) *Attorney, Agent, or Firm* — Westerman, Hattori, Daniels & Adrian, LLP

(57) ABSTRACT

An active energy ray-curable composition is disclosed including:
an anionically polymerizable compound represented by (1):

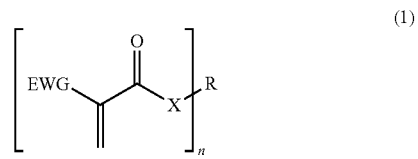

wherein EWG represents an electron-withdrawing group, X represents a single bond or an oxygen atom (—O—), R represents an n-valent organic group, and n represents an integer of 1 to 6; when n is an integer of 2 to 6, the respective EWG and the respective X may be the same or different; and when n is 1, EWG and R may be bonded; and
a compound (photobase generator) represented by (2):

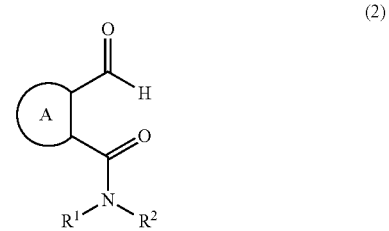

wherein ring A represents an aromatic ring that may be substituted or a heteroaromatic ring that may be substituted; $R^1$ and $R^2$ are the same or different and each represents a hydrogen atom or an alkyl group; $R^1$ and $R^2$ may be bonded to each other to form a ring together with an adjacent nitrogen atom; and the ring may be substituted.

15 Claims, 1 Drawing Sheet

(51) Int. Cl.
  *C09J 4/00* (2006.01)
  *C09J 11/06* (2006.01)

(56) References Cited

U.S. PATENT DOCUMENTS

| | | | |
|---|---|---|---|
| 2010/0029978 | A1* | 2/2010 | Swords .................. C09J 4/00 558/381 |
| 2013/0267625 | A1 | 10/2013 | Noguchi et al. |
| 2015/0073110 | A1 | 3/2015 | Malofsky et al. |
| 2017/0293225 | A1 | 10/2017 | Arimitsu et al. |
| 2018/0371124 | A1* | 12/2018 | Woods .................. C08K 3/38 |

FOREIGN PATENT DOCUMENTS

| | | | |
|---|---|---|---|
| JP | 2013-216728 | A | 10/2013 |
| JP | 2013-227496 | A | 11/2013 |
| JP | 2015-512460 | A | 4/2015 |
| JP | 2017-36361 | A | 2/2017 |
| JP | 2017-155204 | A | 9/2017 |
| JP | 2018-131593 | A | 8/2018 |
| JP | 2018131593 | * | 8/2018 |
| WO | 2013/149165 | A1 | 10/2013 |
| WO | 2016/052493 | A1 | 4/2016 |
| WO | 2017/151711 | A1 | 9/2017 |

OTHER PUBLICATIONS

International Search Report dated Feb. 12, 2019, issued in counterpart International Application No. PCT/JP2018/044205. (2 pages).
Ohbora et al., "Development of novel photobase generators based on a photocyclization reaction and their application to photoreactive materials", Polymer Preprints, Japan [CD-ROM], (2016), vol. 65, No. 2. w/English Abstract. Cited in Specification and ISR. (4 pages).
Kessar et al. "Intramolecular photoreactions of 2-formylbenzamides and 2-formylbenzylamines", Journal of the Chemical Society, Chemical Communications, (1993), issue 7, pp. 598-599. Cited in Specification. (3 pages).
Kunichika et al., "Studies on the Reaction of Malonic Ester with Formaldehyde", Journal of the Chemical Society of Japan, (1972), No. 3, pp. 596-598. w/English Abstract. (3 pages).
Takagi et al., "(418) Studies on Reaction between Active Methylene Group and Formaldehyde (First Report) Synthesis of methylene malonic acid diethyl ester", Journal of the Chemical Society of Japan, (1953), vol. 56, No. 11, pp. 81-83. (10 pages).

* cited by examiner

ACTIVE ENERGY RAY-CURABLE COMPOSITION

TECHNICAL FIELD

The present invention relates to an active energy ray-curable composition.

BACKGROUND ART

Active energy ray-curable compositions are widely used for applications, such as adhesives, coating agents, sealants, and excipients. Photopolymerization reactions using active energy ray-curable compositions are classified into three types: radical polymerization, cationic polymerization, and anionic polymerization, depending on the active species generated during polymerization.

In radical polymerization, radically polymerizable compounds are polymerized using radical active species obtained by light irradiation on a photoradical initiator. However, there is a problem that radicals are deactivated by oxygen to inhibit the polymerization, leading to insufficient curing of areas exposed to air. In cationic polymerization, cationically polymerizable compounds are polymerized using, as catalysts, strong acids obtained by light irradiation on a photoacid generator. Although the polymerization is not inhibited by oxygen, there is a problem that the strong acids produced cause corrosion of metal substrates etc. In contrast, anionic polymerization is a polymerization reaction of anionically polymerizable compounds using, as catalysts, bases obtained by light irradiation on a photobase generator. This polymerization reaction has attracted attention because there are no problems, such as inhibition of polymerization by oxygen as in radical polymerization, and corrosion as in cationic polymerization.

PTL 1 describes the use of a carboxylate comprising a carboxylic acid, an alkali metal, an alkaline earth metal, imidazoles, guanidines, etc., as a photobase generator for anionic polymerization. Further, it is described that a curing reaction (crosslinking reaction) proceeds due to light irradiation and heat treatment on a film of a photosensitive resin composition comprising the photobase generator and an epoxy compound. However, the photobase generator also produced carbon dioxide gas at the same time as the production of a base by the action of light, thereby causing problems that the formation of air bubbles due to light irradiation after the film formation of the photosensitive resin composition resulted in the formation of irregularities on the cured film.

PTL 2 indicates that when a carboxylate comprising a specific carboxylic acid and a base is used as a photobase generator, a base can be generated by the action of light without producing carbon dioxide gas.

PTL 3 discloses an active ray-curable composition comprising an anionically polymerizable compound and a photobase generator comprising a salt of a carboxylic acid and a basic compound, wherein an acid that loses its function due to light or heat is added in order to improve the storage stability of the composition before light irradiation.

PTL 4 discloses a method for photopolymerizing a mixture of methylenemalonate and cyanoacrylate using a ferrocene-based photobase generator. This method has a problem that the curability is reduced as the proportion of methylenemalonate increases.

PTL 5 discloses an ion-pair type photobase generator comprising an anion and a compound having a substituent having a cationized amidine skeleton. It is also described that a cured film can be produced by UV irradiation of a photocurable composition comprising the photobase generator and a dialkyl methylenemalonate compound.

PTL 6 discloses a composition comprising 2-cyanoacrylate and a photolatent base having a carbamate group, and indicates that the curing of cyanoacrylate is promoted by UV irradiation. However, there is a problem that the photolatent base produces carbon dioxide gas upon UV irradiation, thereby reducing the quality of the cured film.

NPL 1 describes the use of a phthalaldehyde acid amide compound, which produces a tertiary amine compound by a photocyclization reaction, as a photobase generator. The photobase generator is described as being applicable to anionic polymerization of compounds having an epoxy group in a side chain, such as poly(glycidyl methacrylate) (PGMA).

NPL 2 indicates that when a phthalaldehyde acid amide compound is irradiated with light, a photocyclization reaction occurs to produce an amino lactone compound.

CITATION LIST

Patent Literature

PTL 1: JP2011-080032A (JP5561693B)
PTL 2: JP2012-250969A (JP5765851B)
PTL 3: JP2013-216728A (JP6008166B)
PTL 4: JP2015-512460A
PTL 5: JP2017-036361A
PTL 6: WO2017/151711

Non-Patent Literature

NPL 1: Polymer Preprints, Japan Vol. 65, No. 2 (2016)
NPL 2: Journal of the Chemical Society, Chemical Communications, (7), 598-599; 1993

SUMMARY OF INVENTION

Technical Problem

The photobase generators described in PTL 1 and PTL 6 have a problem that carbon dioxide gas produced by active ray irradiation causes the irregularities of the cured film and a strength reduction.

The photobase generators described in PTL 2 to PTL 4 did not produce carbon dioxide gas upon active ray irradiation; however, it was clarified that in the case of active ray-curable compositions comprising highly reactive anionically polymerizable compounds, such as methylenemalonate and cyanoacrylate, and these photobase generators, the storage stability of the compositions before active ray irradiation was extremely low. One of the reasons for this was considered to be that since the photobase generators had an ion pair, the highly reactive anionically polymerizable compounds induced a polymerization reaction (dark reaction) under conditions not associated with active rays.

Similarly, since the photobase generator described in PTL 5 also has an ion pair (cations and anions derived from the amidine skeleton), the storage stability of the composition before active ray irradiation is considered to be low.

Further, NPL 1 describes the use of a phthalaldehyde acid amide compound as a photobase generator to cure anionically polymerizable compounds with relatively low reactivity, such as poly(glycidyl methacrylate), but does not describe application to highly reactive anionically polymerizable compounds.

In view of the above points, an object of the present invention is to provide an active energy ray-curable composition comprising a highly reactive anionically polymerizable compound and a photobase generator, the composition having excellent storage stability before active energy ray irradiation, not producing carbon dioxide gas, and having high photopolymerization reactivity.

Solution to Problem

The present inventors conducted intensive studies to achieve the above objects, and consequently found that the above objects can be achieved by an active energy ray-curable composition comprising a highly reactive anionically polymerizable compound and a compound represented by the following formula (2) as a photobase generator. The present invention has been completed upon further studies.

That is, the present invention provides an active energy ray-curable composition and a method for producing the same described below.

[1] An active energy ray-curable composition comprising:
an anionically polymerizable compound represented by formula (1):

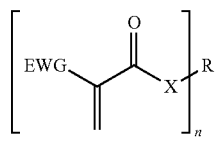

wherein EWG represents an electron-withdrawing group, X represents a single bond or an oxygen atom (—O—), R represents an n-valent organic group, and n represents an integer of 1 to 6; when n is an integer of 2 to 6, the respective EWG and the respective x may be the same or different; and when n is 1, EWG and R may be bonded; and
a compound (photobase generator) represented by formula (2):

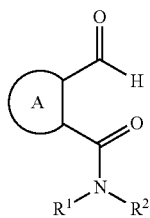

wherein ring A represents an aromatic ring that may be substituted or a heteroaromatic ring that may be substituted; $R^1$ and $R^2$ are the same or different and each represents a hydrogen atom or an alkyl group; $R^1$ and $R^2$ may be bonded to each other to form a ring together with an adjacent nitrogen atom; and the ring may be substituted.

[2] The active energy ray-curable composition according to [1], wherein in formula (1), the electron-withdrawing group represented by EWG is a cyano group, an ester group, or an acyl group.

[3] The active energy ray-curable composition according to [1] or [2], wherein in formula (1), the electron-withdrawing group represented by EWG is a group represented by the formula: $R^3O$—$C(=O)$—, wherein $R^3$ represents an alkyl group, a cycloalkyl group, an aryl group, or an aralkyl group; or a group represented by the formula: $R^4$—$C(=O)$—, wherein $R^4$ represents an alkyl group, a cycloalkyl group, an aryl group, or an aralkyl group.

[4] The active energy ray-curable composition according to any one of [1] to [3], wherein in formula (1), the electron-withdrawing group represented by EWG is a group represented by the formula: $R^3O$—$C(=O)$—, wherein $R^3$ represents an alkyl group.

[5] The active energy ray-curable composition according to any one of [1] to [4], wherein in formula (1), X is an oxygen atom.

[6] The active energy ray-curable composition according to any one of [1] to [5], wherein in formula (1), n is 1, and the monovalent organic group represented by R is an alkyl group, an alkoxyalkyl group, a cycloalkyl group, an aryl group, or an aralkyl group; or n is 2, and the divalent organic group represented by R is an alkylene group, an alkylene-oxyalkylene group, an alkylene-poly(oxyalkylene) group, a cycloalkylene group, an arylene group, or a divalent group in which two or more groups selected from the group consisting of these divalent groups are bonded.

[7] The active energy ray-curable composition according to any one of [1] to [6], wherein in formula (1), n is 1, and the monovalent organic group represented by R is an alkyl group.

[8] The active energy ray-curable composition according to [1], wherein in formula (1), when n is 1, the compound in which EWG and R are bonded is represented by formula (1a):

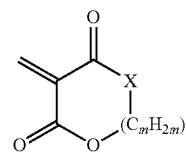

wherein m represents an integer of 1 to 10, and X is as defined above.

[9] The active energy ray-curable composition according to [1], wherein the compound represented by formula (1) is at least one member selected from the group consisting of dialkyl 2-methylenemalonate, alkyl 2-acylacrylate, alkyl 2-cyanoacrylate, and a 5-methylene-1,3-dioxane-4,6-dione compound.

[10] The active energy ray-curable composition according to any one of [1] to [9], wherein in formula (2), ring A is a benzene ring that may be substituted.

[11] The active energy ray-curable composition according to any one of [1] to [10], wherein in formula (2), $R^1$ and $R^2$ are the same or different and each represents an alkyl group; or $R^1$ and $R^2$ are bonded to each other to form, together with an adjacent nitrogen atom, one ring selected from the group consisting of an aziridine ring, an azetidine ring, a pyrrolidine ring, a piperidine ring, a morpholine ring, an imidazole ring, a pyrazole ring, and a 1,2,3,4-tetrahydroisoquinoline ring; and the ring may be substituted.

[12] The active energy ray-curable composition according to any one of [1] to [11], for use in a coating agent, a printing ink, a photoresist, an adhesive, or a sealant.

[13] A method for producing the active energy ray-curable composition according to [1], the method comprising mixing an anionically polymerizable compound represented by formula (1) and a compound (photobase generator) represented by formula (2).

[14] A method for producing a cured product, the method comprising irradiating the active energy ray-curable composition according to [1] with an active energy ray, the active energy ray-curable composition comprising an anionically polymerizable compound represented by formula (1) and a compound (photobase generator) represented by formula (2).

[15] A cured product obtained by the production method according to [14].

Advantageous Effects of Invention

The active energy ray-curable composition of the present invention comprises a highly reactive anionically polymerizable compound represented by formula (1) and a photobase generator represented by formula (2). The composition has excellent storage stability before active energy ray irradiation, and the photopolymerization reaction proceeds rapidly upon active energy ray irradiation without producing carbon dioxide gas.

Specifically, unlike the ion-pair type photobase generators described in PTL 1 to PTL 5, the active energy ray-curable composition of the present invention uses the non-ion-pair type photobase generator represented by formula (2); thus, the stability of the composition before active energy ray irradiation is significantly improved. Therefore, the composition can maintain a constant quality for a long period of time without an increase in the viscosity due to gelation etc.; thus, quality control is facilitated, and the pot life and open time can be adjusted very easily.

Moreover, since the photobase generator represented by formula (2) rapidly produces a strongly basic amine compound upon active energy ray irradiation, the photopolymerization reactivity of the coexisting anionically polymerizable compound represented by formula (1) can be enhanced.

Furthermore, since the photobase generator represented by formula (2) can produce a strong base upon active energy ray irradiation without producing carbon dioxide gas, high-quality cured films, molded articles, etc., can be produced.

After active energy ray irradiation, a tertiary amine produced from the compound (photobase generator) represented by formula (2) effectively starts the anionic polymerization reaction of the anionically polymerizable compound represented by formula (1), and the curing of a part that is not directly exposed to light (shielded part), and the curing of the composition that contains pigments and fillers in high concentrations and that is less likely to be uniformly exposed to light, efficiently proceed.

DESCRIPTION OF EMBODIMENTS

Figure 1:
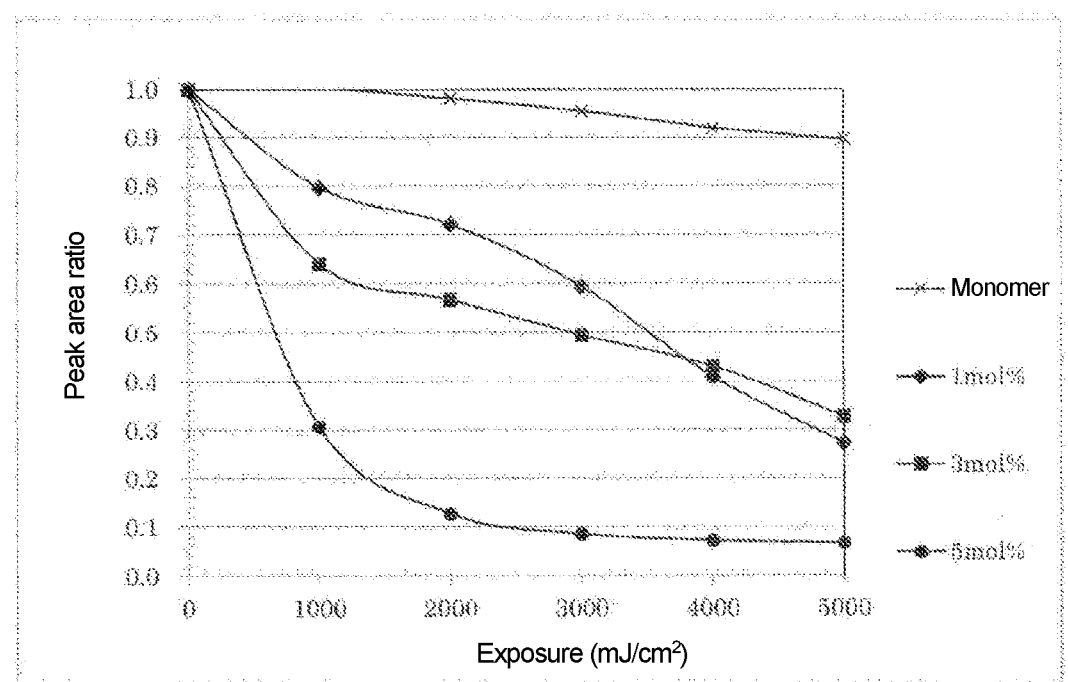
FIG. 1 is a graph showing the relationship between the exposure of ultraviolet light and the amount of monomer remaining in the composition when light was applied to the active energy ray-curable compositions prepared in Examples 1 to 3, and to the monomer of Comparative Example 2 alone. The horizontal axis represents the exposure, and the vertical axis represents the ratio of the area of the IR peak (C=C absorption at 1638 $cm^{-1}$) of the raw material monomer at each exposure based on the area of the IR peak (C=C absorption at 1638 $cm^{-1}$) of the raw material monomer at an exposure of 0 $mJ/cm^2$ (peak area ratio).

The present invention is described in detail below.

The active energy ray-curable composition of the present invention is characterized by comprising an anionically polymerizable compound represented by formula (1) and a photobase generator comprising a compound represented by formula (2).

1. Anionically Polymerizable Compound

The anionically polymerizable compound represented by formula (1) is a 1,1-disubstituted double-activated vinyl compound with high reactivity. In formula (1), examples of the electron-withdrawing group represented by EWG include a cyano group (—C≡N), an ester group, an acyl group, and the like.

Examples of the ester group include a group represented by the formula: $R^3O$—C(=O)—, wherein $R^3$ represents an alkyl group, a cycloalkyl group, an aryl group, or an aralkyl group.

Examples of the alkyl group represented by $R^3$ include linear or branched alkyl groups, and generally include $C_1$-$C_{20}$ alkyl groups. Specific examples include a methyl group, an ethyl group, an n-propyl group, an isopropyl group, an n-butyl group, a sec-butyl group, a tert-butyl group, an isobutyl group, a pentyl group, a hexyl group, a heptyl group, an octyl group, a nonyl group, a decyl group, a dodecyl group, and the like. Preferable are $C_1$-$C_{10}$ alkyl groups, more preferable are $C_1$-$C_6$ alkyl groups, even more preferable are $C_1$-$C_3$ alkyl groups, and particularly preferable is a methyl group or an ethyl group.

Examples of the cycloalkyl group represented by $R^3$ generally include $C_3$-$C_{10}$ cycloalkyl groups. Specific examples include a cyclopropyl group, a cyclobutyl group, a cyclopentyl group, a cyclohexyl group, a cycloheptyl group, and the like. Preferable are $C_3$-$C_8$ cycloalkyl groups, and more preferable are $C_3$-$C_6$ cycloalkyl groups.

Examples of the aryl group represented by $R^3$ include $C_6$-$C_{20}$ aryl groups having a single ring or two or more condensed rings. Specific examples include a phenyl group, a toluyl group, a xylyl group, a naphthyl group, a phenanthryl group, an anthranyl group, and the like.

Examples of the aralkyl group represented by $R^3$ include groups in which one hydrogen atom on the above alkyl groups is substituted with the above aryl group. Specific examples include a benzyl group, a phenethyl group, and the like.

Examples of the acyl group include a group represented by the formula: $R^4$—C(=O)—, wherein $R^4$ represents an alkyl group, a cycloalkyl group, an aryl group, or an aralkyl group.

The alkyl group, cycloalkyl group, aryl group, or aralkyl group represented by $R^4$ can be selected from those mentioned above for the alkyl group, cycloalkyl group, aryl group, or aralkyl group represented by $R^3$.

X is a single bond or an oxygen atom (—O—), and preferably an oxygen atom (—O—).

R represents an n-valent hydrocarbon group, and n represents an integer of 1 to 6. n is preferably 1 or 2.

When n is 1, examples of the organic group represented by R include monovalent groups, such as alkyl, alkoxyalkyl, cycloalkyl, aryl, and aralkyl groups. These groups may be substituted as long as the effects of the present invention can be exhibited.

Examples of alkyl groups include linear or branched alkyl groups, and generally include $C_1$-$C_{20}$ alkyl groups. Specific examples include a methyl group, an ethyl group, an n-propyl group, an isopropyl group, an n-butyl group, a sec-butyl group, a tert-butyl group, an isobutyl group, a pentyl group, a hexyl group, a heptyl group, an octyl group, a nonyl group, a decyl group, a dodecyl group, and the like. Preferable are $C_1$-$C_{10}$ alkyl groups, more preferable are $C_1$-$C_6$ alkyl groups, even more preferable are $C_1$-$C_3$ alkyl groups, and particularly preferable is a methyl group or an ethyl group.

Examples of alkoxyalkyl groups generally include $C_1$-$C_1$ alkoxy $C_2$-$C_{10}$ alkyl groups. Specific examples include a methoxyethyl group, a 2-(2-ethoxy)ethoxyethyl group, and the like.

Examples of cycloalkyl groups generally include $C_3$-$C_{10}$ cycloalkyl groups. Specific examples include a cyclopropyl group, a cyclobutyl group, a cyclopentyl group, a cyclohexyl group, a cycloheptyl group, and the like. Preferable are $C_3$-$C_8$ cycloalkyl groups, and more preferable are $C_3$-$C_6$ cycloalkyl groups.

Examples of aryl groups include $C_6$-$C_{20}$ aryl groups having a single ring or two or more condensed rings. Specific examples include a phenyl group, a toluyl group, a xylyl group, a naphthyl group, a phenanthryl group, an anthranyl group, and the like.

Examples of aralkyl groups include groups in which one hydrogen atom on the above alkyl groups is substituted with the above aryl group. Specific examples include a benzyl group, a phenethyl group, and the like.

When the monovalent group, such as an alkyl group, an alkoxyalkyl group, a cycloalkyl group, an aryl group, or an aralkyl group, is substituted, examples of substituents include an alkoxy group, an ester group, an acyl group, a hydroxy group, and the like.

When n is 2, examples of the organic group represented by R include divalent groups, such as alkylene, alkylene-oxyalkylene, alkylene-poly(oxyalkylene), cycloalkylene, and arylene groups. Further, the organic group represented by R may be a divalent group in which two or more groups selected from the group consisting of these divalent groups are bonded. These groups may be substituted as long as the effects of the present invention can be exhibited.

Examples of alkylene groups include linear or branched alkylene groups, and generally include $C_1$-$C_{20}$ alkylene groups. Preferable are $C_1$-$C_{10}$ alkylene groups.

Examples of alkylene-oxyalkylene groups generally include $C_2$-$C_{10}$ alkylene-oxy $C_2$-$C_{10}$ alkylene groups. Specific examples include an ethylene-oxyethylene group (—$CH_2CH_2$—O—$CH_2CH_2$—), a propylene-oxypropylene group (e.g., —$CH_2CH(CH_3)$—O—$CH_2CH(CH_3)$—), and the like.

Examples of alkylene-poly(oxyalkylene) groups generally include $C_2$-$C_{10}$ alkylene-poly(oxy $C_2$-$C_{10}$ alkylene) groups, and preferably $C_2$-$C_3$ alkylene-poly(oxy $C_2$-$C_3$ alkylene) groups. The number of repeating oxyalkylene units is preferably 2 to 10, and more preferably 2 to 6. Specific examples include ethylene-poly(oxyethylene) groups, such as ethylene-di(oxyethylene), ethylene-tri (oxyethylene), and ethylene-tetra(oxyethylene) groups; propylene-poly(oxypropylene) groups, such as propylene-di(oxypropylene), propylene-tri (oxypropylene), and propylene-tetra(oxypropylene) groups; and the like.

Examples of cycloalkylene groups generally include $C_3$-$C_{10}$ cycloalkylene groups.

Examples of arylene groups include divalent groups in which two hydrogen atoms are removed from a monocyclic aromatic ring or two or more condensed aromatic rings. Specific examples include a phenylene group and the like.

When the divalent group, such as an alkylene group, an alkylene-oxyalkylene group, an alkylene-poly(oxyalkylene) group, a cycloalkylene group, or an arylene group, is substituted, examples of substituents include an alkoxy group, an ester group, an acyl group, a hydroxy group, and the like.

In formula (1), when n is 1, the compound in which EWG and R are bonded is, for example, a compound represented by formula (1a):

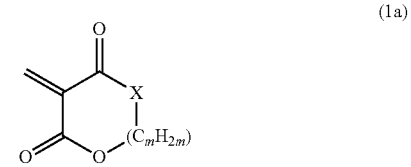

(1a)

wherein m represents an integer of 1 to 10, and X is as defined above.

X is preferably an oxygen atom (—O—).

m is preferably an integer of 1 to 6, more preferably an integer of 1 to 4, and particularly preferably 1. Examples of the group represented by the formula: —($C_mH_{2m}$)— include a methylene group (—$CH_2$—), a dimethylene group (—$CH_2CH_2$—), a 1,1-dimethylmethylene group (—$C(CH_3)_2$—), and the like.

When n is 1, preferable specific examples of the compound represented by formula (1) include dialkyl 2-methylenemalonates, such as dimethyl 2-methylenemalonate, diethyl 2-methylenemalonate, dibutyl 2-methylenemalonate, 1-methyl-3-hexyl 2-methylenemalonate, and dicyclohexyl 2-methylenemalonate; alkyl 2-acylacrylates, such as methyl 2-acetylacrylate, ethyl 2-acetylacrylate, methyl 2-propionylacrylate, and ethyl 2-propionylacrylate; alkyl 2-cyanoacrylates, such as methyl 2-cyanoacrylate, ethyl 2-cyanoacrylate, and octyl 2-cyanoacrylate; 5-methylene-1,3-dioxane-4,6-dione compounds, such as 5-methylene-1,3-dioxane-4,6-dione and 2,2-dimethyl-5-methylene-1,3-dioxane-4,6-dione; and the like. Preferable are diethyl 2-methylenemalonate and 5-methylene-1,3-dioxane-4,6-dione.

When n is 2, examples include compounds obtained by transesterification of dialkyl 2-methylenemalonates and alkylene diols (e.g., transesterification of dimethyl 2-methylenemalonate and 1,6-hexanediol), compounds obtained by transesterification of dialkyl 2-methylenemalonates and polyalkylene glycols, and the like.

The compound represented by formula (1) is commercially available or can be produced by a known method. For example, a dialkyl 2-methylenemalonate compound can be produced based on or according to the description of Journal of the Chemical Society of Japan, No. 3, pp. 596-598 (1972), Journal of the Chemical Society of Japan, vol. 56, no. 11, pp. 81-83 (1953), or the like.

2. Photobase Generator

The compound represented by formula (2) acts as a photobase generator. That is, this compound is excited by irradiation with an active energy ray, the cyclization reaction represented by the following formula proceeds to produce an amine compound (base) represented by formula (3), and the polymerization of the anionically polymerizable compound represented by formula (1) is started.

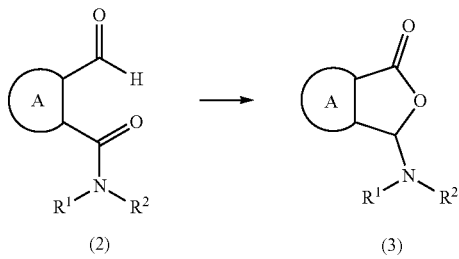

wherein all the symbols are as defined above.

Ring A is an aromatic ring that may be substituted or a heteroaromatic ring that may be substituted.

Examples of the aromatic ring include a monocyclic aromatic ring or two or more condensed aromatic rings. Specific examples include a benzene ring, a naphthalene ring, a phenanthrene ring, an anthracene ring, and the like. Preferable is a benzene ring.

Examples of the heteroaromatic ring include a monocyclic heteroaromatic ring or two or more condensed heteroaromatic rings containing at least one heteroatom selected from the group consisting of oxygen, nitrogen, and sulfur atoms. Specific examples include a thiophene ring, a furan ring, a pyrrole ring, a pyridine ring, a pyrazine ring, and the like.

The aromatic ring or heteroaromatic ring represented by ring A may be substituted. Examples of substituents include alkyl groups (e.g., $C_1$-$C_6$ alkyl groups) and the like. The aromatic ring or heteroaromatic ring may be substituted with 1 to 3 groups selected from the group consisting of these substituents.

$R^1$ and $R^2$ are the same or different and each represents a hydrogen atom or an alkyl group, and preferably an alkyl group. Examples of the alkyl group include linear or branched alkyl groups, and generally include $C_1$-$C_{20}$ alkyl groups. Specific examples include a methyl group, an ethyl group, an n-propyl group, an isopropyl group, an n-butyl group, a sec-butyl group, a tert-butyl group, an isobutyl group, a pentyl group, a hexyl group, a heptyl group, an octyl group, a nonyl group, a decyl group, a dodecyl group, and the like. Preferable are $C_1$-$C_{10}$ alkyl groups, more preferable are $C_1$-$C_6$ alkyl groups, even more preferable are $C_1$-$C_3$ alkyl groups, and particularly preferable is a methyl group or an ethyl group.

$R^1$ and $R^2$ may be bonded to each other to form a ring together with the adjacent nitrogen atom. Examples of the ring include a single ring or two or more condensed rings. Specific examples include an aziridine ring, an azetidine ring, a pyrrolidine ring, a piperidine ring, a morpholine ring, an imidazole ring, a pyrazole ring, a 1,2,3,4-tetrahydroisoquinoline ring, and the like. Preferable is a piperidine ring.

The ring formed by $R^1$ and $R^2$ together with the adjacent nitrogen atom may be substituted. Examples of substituents include alkyl groups (e.g., $C_1$-$C_6$ alkyl groups) and the like. The ring may be substituted with 1 to 6 groups selected from the group consisting of these substituents.

In the compound represented by formula (2), it is preferable that $R^1$ and $R^2$ are the same or different and are alkyl groups, or that $R^1$ and $R^2$ are bonded to each other to form a ring together with the adjacent nitrogen atom. This is because the anionic polymerization reaction can be more effectively started when the basic compound represented by formula (3) generated after active energy ray irradiation is a tertiary amine, rather than a primary or secondary amine.

Preferable specific examples of the compound represented by formula (2) include a compound in which ring A is a benzene ring, and $R^1$ and $R^2$ are each a $C_1$-$C_6$ alkyl group (further a $C_1$-$C_3$ alkyl group, particularly a methyl group or an ethyl group); and a compound in which $R^1$ and $R^2$ are bonded to each other to form a piperidine ring or a pyrrolidine ring together with the adjacent nitrogen atom.

The compound represented by formula (2) is commercially available or can be produced by a known method. For example, this compound can be produced based on or according to the description of J. Chem. Soc., Perkin Trans. I, pp. 344-348.

3. Active Energy Ray-Curable Composition.

The active energy ray-curable composition of the present invention comprises an anionically polymerizable compound represented by formula (1) and a compound (photobase generator) represented by formula (2).

The contents of the anionically polymerizable compound represented by formula (1) and the compound represented by formula (2) in the active energy ray-curable composition can be suitably selected within a range in which the effects of the present invention can be exhibited. The content of the compound represented by formula (2) is generally 0.1 to 60 mol, preferably 0.5 to 15 mol, and more preferably 1 to 10 mol, per 100 mol of the anionically polymerizable compound represented by formula (1).

The active energy ray-curable composition may further contain other components depending on its application. For example, the composition may contain anionically polymerizable compounds other than the anionically polymerizable compound represented by formula (1), radically polymerizable compounds, solvents, sensitizers, polymerization inhibitors, adhesion promoters (e.g., silane coupling agents), and the like. Further, examples of other additives include fillers, pigments, dyes, leveling agents, antifoaming agents, antistatic agents, ultraviolet absorbers, pH adjusters, dispersants, dispersing aids, surface modifiers, plasticizers, plasticization accelerators, anti-sagging agents, curing accelerators, thickeners, viscoelasticity modifiers, antibacterial agents, fluorescent whitening agents, antioxidants, and the like. These can be used singly or in a combination of two or more.

Anionically polymerizable compounds other than the anionically polymerizable compound represented by formula (1) are not particularly limited within a range in which the effects of the present invention can be exhibited. Examples include polymerizable epoxy compounds (e.g., compounds having two or more glycidyl groups, such as bisphenol A diglycidyl ether) and the like.

Radically polymerizable compounds are not particularly limited within a range in which the effects of the present invention can be exhibited. Examples include polymerizable (meth)acrylic compounds, polymerizable (meth)acrylamide compounds, and the like.

The solvent is not particularly limited as long as the effects of the present invention can be exhibited. Examples include aromatic hydrocarbon solvents, such as benzene, toluene, and xylene; saturated hydrocarbon solvents, such as hexane, cyclohexane, and heptane; ether solvents, such as diethyl ether, diisopropyl ether, tetrahydrofuran, dioxane, ethylene glycol monomethyl ether, and propylene glycol monomethyl ether; ketone solvents, such as acetone, methyl ethyl ketone, and methyl isobutyl ketone; ester solvents, such as ethyl acetate, butyl acetate, and propylene glycol monomethyl ether acetate; halogenated hydrocarbon solvents, such as chloroform; and the like. These can be used singly or in a combination of two or more.

When the active energy ray-curable composition contains a solvent, the content of the solvent is generally 1 to 1000 parts by mass, preferably 1 to 500 parts by mass, and more preferably 1 to 300 parts by mass, per 100 parts by mass of the anionically polymerizable compound represented by formula (1).

As sensitizers, polymerization inhibitors, and adhesion promoters (e.g., silane coupling agents), those that are known can be used.

The active energy ray-curable composition can be prepared by mixing the anionically polymerizable compound represented by formula (1), the compound (photobase generator) represented by formula (2), and optionally other components. The mixing method is not particularly limited, and mixing can be performed, for example, using a known stirring device.

The active energy ray-curable composition of the present invention characteristically has excellent storage stability before active energy ray irradiation. The compound (photobase generator) represented by formula (2) is not a conventional ion-pair type (PTL 1 to PTL 5) carboxylate, but is a non-ion-pair type neutral compound; thus, the composition can maintain its stability for a long period of time, although it contains a highly reactive anionically polymerizable compound.

When the active energy ray-curable composition is irradiated with an active energy ray, a basic compound generated from the compound represented by formula (2) acts as a catalyst, and the anionically polymerizable compound represented by formula (1) is polymerized to give a cured product.

After active energy ray irradiation, the amine compound represented by formula (3) generated from the compound (photobase generator) represented by formula (2) effectively starts the anionic polymerization reaction of the anionically polymerizable compound represented by formula (1), and the curing of a part that is not directly exposed to light (shielded part), and the curing of the composition that contains pigments and fillers in high concentrations and that is less likely to be uniformly exposed to light, efficiently proceed. The mechanism is presumed to be due to diffusion of a tertiary amine into the resin, or due to propagation of the production of a tertiary amine. In particular, it is preferable that $R^1$ and $R^2$ in the compound represented by formula (2), which is a photobase generator, are alkyl groups; that is, it is preferable that the amine compound represented by formula (3) generated by light irradiation is a tertiary amine, and that $R^1$ and $R^2$ are not bonded to each other, because the curability of the composition in the part shielded from light is greatly improved.

Examples of the active energy ray generally include ultraviolet light, electron beams, and the like. Examples of ultraviolet light sources include a low-pressure mercury lamp, a medium-pressure mercury lamp, a high-pressure mercury lamp, an ultra-high-pressure mercury lamp, a xenon lamp, a metal halide lamp, and the like. Other examples include an ultraviolet device using a light emitting diode as a light source (UV-LED), a laser beam in the ultraviolet region, and the like.

Due to the above characteristics, the active energy ray-curable composition of the present invention can be used for various applications depending on the characteristics. Examples include, but are not limited to, coating agents (e.g., protective coating agents), printing inks (e.g., inkjet inks), photoresists, adhesives, sealants, and the like.

The active energy ray-curable composition can be applied to various substrates, and then irradiated with the above-mentioned active ray to form cured products closely attached to the substrates.

Examples of substrates include plastics, rubber, wood, metals, inorganic materials, paper, and the like. Specific examples of plastics include polyvinyl alcohols; cellulose acetate resins, such as triacetyl cellulose and diacetyl cellulose; acrylic resins; polyethylene terephthalate; polycarbonate; polyarylate; polyethersulfone; cyclic polyolefin resins having a cyclic olefin as a monomer, such as norbornene; polyvinyl chloride; epoxy resins; polyurethane resins, and the like. Specific examples of rubber include natural rubber, SBR, and the like. Specific examples of wood include natural wood, synthetic wood, and the like. Specific examples of metals include steel plates, metals such as aluminum and chromium, metal oxides such as zinc oxide (ZnO) and indium tin oxide (ITO), and the like. Specific examples of inorganic materials include glass, mortar, concrete, stone materials, and the like. Specific examples of paper include high-quality paper, coated paper, art paper, imitation paper, thin paper, thick paper, and various types of synthetic paper.

Moreover, the active energy ray-curable composition can be used to obtain a molded article. For example, a molded article can be obtained by filling an intaglio plate with the active energy ray-curable resin composition of the present invention, curing the filled resin composition with an active energy ray, and then taking out the resulting cured product from the recess.

EXAMPLES

The present invention is described in detail below with reference to Examples and Comparative Examples; however, the present invention is not limited thereto.

Production Example 1 (Synthesis of PBG1)

7.5 ml (0.13 mol) of thionyl chloride was added to 2.0 g (0.013 mol) of 2-formylbenzoic acid, and the mixture was stirred at room temperature for 8 hours. The thionyl chloride was distilled off under reduced pressure, and the obtained residue was dissolved in 35 ml of tetrahydrofuran. A solution of 3.4 g (0.039 mol) of piperidine dissolved in 20 ml of tetrahydrofuran was added, and the mixture was stirred at room temperature for 12 hours. After 5 wt % hydrochloric acid was added to this solution to make it neutral, the solvent was distilled off under reduced pressure, and the obtained residue was purified by silica gel column chromatography (n-hexane/ethyl acetate=1/1), thereby obtaining 2.0 g (9.2 mmol, yield: 72%) of 2-(1-piperidinylcarbonyl)benzaldehyde (PBG1) as a yellow viscous liquid.

$^1$H-NMR (δ ppm, CDCl$_3$) 1.2-1.7 (m, 6H), 3.15 (t, 2H), 3.80 (t, 2H), 7.3-8.0 (m, 4H), 10.8 (s, 1H)

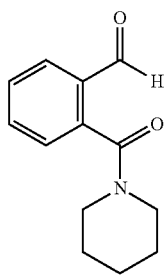

PBG1

Production Example 2 (Synthesis of PBG2)

The following compound (PBG2) corresponding to the base generator described in PTL 1 was synthesized according to the description of Production Example 3 of JP2012-237776A.

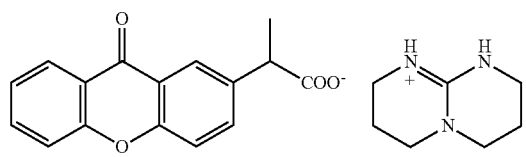

PBG2

Production Example 3 (Synthesis of PBG3)

A solution of 2.1 g (42 mmol) of dipropylamine dissolved in 30 ml of tetrahydrofuran was added dropwise to a solution of 1.5 g (7.0 mmol) of 3-bromophthalide dissolved in 20 ml of tetrahydrofuran, and the mixture was stirred at room temperature for 8 hours. After the solvent was distilled off from the reaction liquid, the resultant was dissolved in chloroform, and then washed once with 5 wt % hydrochloric acid, once with a saturated aqueous solution of sodium hydrogen carbonate, and twice with a saturated saline solution. The organic layer was dried over magnesium sulfate, the solvent was distilled off, and the obtained residue was purified by silica gel column chromatography (n-hexane/ethyl acetate=1/1), thereby obtaining 1.3 g (5.6 mmol, yield: 78%) of 2-(dipropylaminocarbonyl)benzaldehyde (PBG3) as a pale yellow viscous liquid.

$^1$H-NMR (δ ppm, CDCl$_3$) 0.71 (t, 3H), 1.01 (t, 3H), 1.48 (m, 2H), 1.77 (m, 2H), 3.02 (t, 2H), 3.52 (t, 2H), 7.3-7.9 (m, 4H), 10.1 (s, 1H)

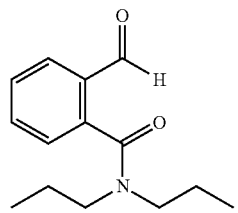

PBG3

Examples 1 to 3 and Comparative Examples 1 and 2

As shown in Table 1, a predetermined amount of photobase generator PBG1 or PBG2 was mixed with diethyl 2-methylenemalonate (DEMM) at room temperature (25° C.) (Examples 1 to 3 and Comparative Example 1).

As a result, active energy ray-curable compositions (Examples 1 to 3) were obtained when using PBG1, which was the photobase generator of the present invention.

In contrast, when PBG2, which was the photobase generator described in PTL 1, was used, the mixture was cured quickly during mixing at room temperature (25° C.) and lost its fluidity. Thus, no composition was obtained (Comparative Example 1).

The case where only DEMM was used was regarded as Comparative Example 2.

Examples 4 and 5, and Comparative Examples 3 and 4

As shown in Table 1, a predetermined amount of photobase generator PBG1, PBG2, or PBG3 was mixed with 2-octyl cyanoacrylate (2-OctCA) at room temperature (25° C.) (Examples 4 and 5, and Comparative Example 3).

As a result, active energy ray-curable compositions (Examples 4 and 5) were obtained when using PBG1 and PBG3, which were the photobase generators of the present invention.

In contrast, when PBG2, which was the photobase generator described in PTL1, was used, the mixture was cured quickly during mixing at room temperature (25° C.) and lost its fluidity. Thus, no composition was obtained (Comparative Example 3).

The case where only 2-OctCA was used was regarded as Comparative Example 4.

Test Example 1 (Evaluation of Storage Stability)

The compositions obtained in Examples 1 to 5, the DEMM of Comparative Example 2, and the 2-OctCA of Comparative Example 4 were left in a refrigerator (4° C.) and visually evaluated for the number of days until their fluidity was lost. The results are shown in Table 1 as the storable time.

TABLE 1

|  | Anionically polymerizable compound | Photobase generator | mol % relative to anionically polymerizable compound | Storable time |
|---|---|---|---|---|
| Example 1 | DEMM | PBG1 | 5 | 3 months or more |

TABLE 1-continued

| | Anionically polymerizable compound | Photobase generator | mol % relative to anionically polymerizable compound | Storable time |
|---|---|---|---|---|
| Example 2 | DEMM | PBG1 | 3 | 3 months or more |
| Example 3 | DEMM | PBG1 | 1 | 3 months or more |
| Comparative Example 1 | DEMM | PBG2 | 5 | 0 |
| Comparative Example 2 | DEMM | — | — | 3 months or more |
| Example 4 | 2-OctCA | PBG1 | 1 | 3 months or more |
| Example 5 | 2-OctCA | PBG3 | 1 | 3 months or more |
| Comparative Example 3 | 2-OctCA | PBG2 | 1 | 0 |
| Comparative Example 4 | 2-OctCA | — | — | 3 months or more |

DEMM: diethyl 2-methylenemalonate
2-OctCA: 2-octyl cyanoacrylate

When PBG2, which was the photobase generator described in PTL 1, was used (Comparative Examples 1 and 3), the mixture was cured quickly during mixing before the evaluation of storage stability, as described above; thus, no composition was obtained, and storage stability could not be evaluated. That is, it was revealed that the storage stability in Comparative Examples 1 and 3 was so low that no composition could be obtained.

In contrast, when PBG1 was used as a photobase generator (Examples 1 to 4) and when PBG3 was used as a photobase generator (Example 5), the fluidity was maintained even after 3 months or more in a refrigerator (4° C.). The storage stability was as high as that when using DEMM alone (Comparative Example 2) and when using 2-OctCA alone (Comparative Example 4).

Test Example 2 (Evaluation of Photopolymerization Reaction)

The active energy ray-curable compositions obtained in Examples 1 to 5 and Comparative Examples 2 and 4 were each drop-casted on a $CaF_2$ plate and immediately sandwiched between the $CaF_2$ plate to coat the $CaF_2$ plate therewith to a film thickness of about 0.8 m. This was irradiated with ultraviolet light at a wavelength of 254 nm (illuminance: 2 mW/cm$^2$) at an exposure of 0, 1000, 2000, 3000, 4000, or 5000 mJ/cm$^2$, and the reaction was tracked by FT-IR measurement.

Figure 2:
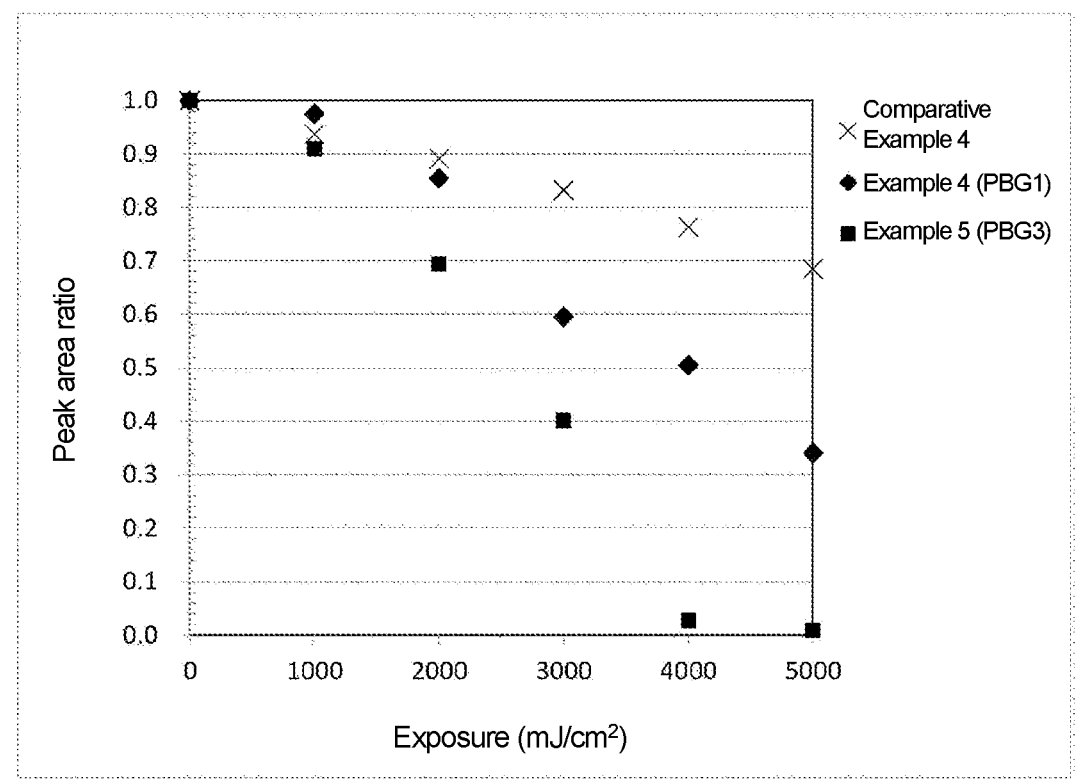
FIG. 2 is a graph showing the relationship between the exposure of ultraviolet light and the amount of monomer remaining in the composition when light was applied to the active energy ray-curable compositions prepared in Examples 4 and 5, and to the monomer of Comparative Example 4 alone. The horizontal axis represents the exposure, and the vertical axis represents the ratio of the area of the IR peak (C=C absorption at 1616 $cm^{-1}$) of the raw material monomer at each exposure based on the area of the IR peak (C=C absorption at 1616 $cm^{-1}$) of the raw material monomer at an exposure of 0 $mJ/cm^2$ (peak area ratio).

The FT-IR spectra of the active energy ray-curable compositions confirmed that a peak of the (C=C) characteristic absorption band derived from diethyl 2-methylenemalonate (DEMM) appeared at 1638 cm-1, and that a peak of the (C=C) characteristic absorption band derived from 2-octyl cyanoacrylate (2-OctCA) appeared at 1616 cm-1. The peak area of the characteristic absorption band derived from DEMM and the peak area of the characteristic absorption band derived from 2-OctCA were used to clarify the relationship between the exposure of ultraviolet light and the residual amount (or consumption) of monomer in each active energy ray-curable composition. FIGS. 1 and 2 show the results.

In FIG. 1, X shows the results of monomer (DEMM) alone (no photobase generator) (Comparative Example 2), ♦ shows the results of 1 mol % of photobase generator (PBG1) (Example 3), ■ shows the results of 3 mol % of photobase generator (PBG1) (Example 2), and ● shows the results of 5 mol % of photobase generator (PBG1) (Example 1).

In FIG. 1, the horizontal axis represents the exposure, and the vertical axis represents the ratio of the peak area at 1638 cm$^{-1}$ at each exposure based on the peak area at 1638 cm$^{-1}$ at an exposure of 0 mJ/cm$^2$ (peak area ratio). A lower peak area ratio means that a smaller amount of DEMM remains, and that the anionic polymerization reaction is promoted.

As shown in FIG. 1, it was confirmed that the peak area ratio decreased at a higher exposure and a higher proportion of photobase generator.

In FIG. 2, X shows the result of monomer (2-OctCA) alone (no photobase generator) (Comparative Example 4), ♦ shows the result of 1 mol % of photobase generator (PBG1) (Example 4), and ■ shows the result of 1 mol % of photobase generator (PBG3) (Example 5).

In FIG. 2, the horizontal axis represents the exposure, and the vertical axis represents the ratio of the peak area at 1616 cm$^{-1}$ at each exposure based on the peak area at 1616 cm$^{-1}$ at an exposure of 0 mJ/cm$^2$ (peak area ratio). A lower peak area ratio means that a smaller amount of 2-OctCA remains, and that the anionic polymerization reaction is promoted.

As shown in FIG. 2, it was confirmed that the peak area ratio decreased at a higher exposure when using PBG3 than when using PBG1.

Test Example 3 (Measurement of Molecular Weight of Polymer)

(1) When the composition of Example 1 exposed at 5000 mJ/cm$^2$ was subjected to 1H-NMR measurement and GPC measurement, it was confirmed that the monomer completely disappeared, and that a polymer having a number average molecular weight (Mn) of 11000 and a weight average molecular weight (Mw) of 573000 was obtained. The number average molecular weight (Mn) and the weight average molecular weight (Mw) were measured using GPC. The GPC measurement conditions were as follows.
Apparatus: Tosoh HLC-8120GPC
Detector: RI detector
Columns:
Two analytical columns: TSKgel SuperHZM-M (particle size: 3 & 5 μm, 6.0 mm I.D.×15 cm)
One guard column: TSKgel guardcolumn SuperHZ-L (4.6 mm I.D.×3.5 cm)
One reference column: TSKgel SuperH-RC (6.0 mm I.D.× 15 cm)
Column temperature: 40° C.
Eluent composition: chloroform, flow rate: 0.6 mL/min
Molecular weight standard: polystyrene (2) When the composition of Example 5 exposed at 3000 mJ/cm$^2$ was subjected to GPC measurement, it was confirmed that a polymer having a number average molecular weight (Mn) of 76000 and a weight average molecular weight (Mw) of 86000 was obtained. The GPC measurement conditions were the same as in Test Example 3 (1). Since the molecular weight distribution (Mw/Mn) is 1.13, the polymerization is considered to proceed in a living manner.

Test Example 4 (Evaluation of Curability of Shielded Part)

0.5 g of the active energy ray-curable composition obtained in Example 5 was drop-casted on a quartz plate (1 cm×2 cm) to coat the quartz plate therewith to a film thickness of about 0.8 mm. This was irradiated with ultraviolet light at a wavelength of 254 nm (illuminance: 2 mW/cm$^2$) at an exposure of 6000 mJ/cm$^2$, while three-quarters of the coating film was shielded with black paper that did not transmit ultraviolet light. When the exposed part and shielded part of the obtained cured coating film was subjected to $^1$H-NMR measurement and GPC measurement, the resulting monomer consumption rate, Mn, and Mw were as shown in Table 2. The GPC measurement conditions were the same as in Test Example 3 (1).

TABLE 2

|  | Exposed part | Shielded part After 15 hours |
|---|---|---|
| Monomer consumption rate | >99% | >99% |
| Mn | 81200 | 65100 |
| Nw | 84900 | 75800 |

As shown in Table 2, the polymerization of the part that was not exposed to ultraviolet light proceeded at room temperature, and the curing of the shielded part was confirmed. Similar results were obtained on silicon wafers other than the quartz plate.

When a sample similarly coated by drop casting was left for 18 hours without exposure, the viscosity of the coating film did not increase, and no progress of polymerization was confirmed.

INDUSTRIAL APPLICABILITY

Since the active energy ray-curable composition of the present invention comprises a highly reactive anionically polymerizable compound represented by formula (1) and a photobase generator represented by formula (2), the composition has excellent storage stability before active energy ray irradiation, and the photopolymerization reaction is promoted by active energy ray irradiation. Therefore, the active energy ray-curable composition of the present invention is used in a wide range of applications, such as coating agents, printing inks, photoresists, adhesives, and sealants.

The invention claimed is:

1. An active energy ray-curable composition comprising:
   an anionically polymerizable compound represented by formula (1):

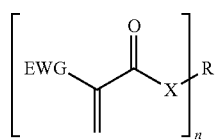

wherein EWG represents an electron-withdrawing group, X represents a single bond or an oxygen atom (—O—), R represents an n-valent organic group, and n represents an integer of 1 to 6; when n is an integer of 2 to 6, the respective EWG and the respective X may be the same or different; and when n is 1, EWG and R may be bonded; and a photobase generator compound represented by formula (2):

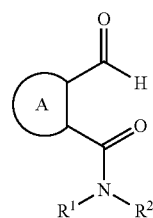

wherein ring A represents an aromatic ring that may be substituted or a heteroaromatic ring that may be substituted; R$^1$ and R$^2$ are the same or different and each represents a hydrogen atom or an alkyl group; R$^1$ and R$^2$ may be bonded to each other to form a ring together with an adjacent nitrogen atom; and the ring may be substituted.

2. The active energy ray-curable composition according to claim 1, wherein in formula (1), the electron-withdrawing group represented by EWG is a cyano group, an ester group, or an acyl group.

3. The active energy ray-curable composition according to claim 1, wherein in formula (1), the electron-withdrawing group represented by EWG is a group represented by the formula: R$^3$O—C(=O)—, wherein R$^3$ represents an alkyl group, a cycloalkyl group, an aryl group, or an aralkyl group; or a group represented by the formula: R$^4$—C(=O)—, wherein R$^4$ represents an alkyl group, a cycloalkyl group, an aryl group, or an aralkyl group.

4. The active energy ray-curable composition according to claim 1, wherein in formula (1), the electron-withdrawing group represented by EWG is a group represented by the formula: R$^3$O—C(=O)—, wherein R$^3$ represents an alkyl group.

5. The active energy ray-curable composition according to claim 1, wherein in formula (1), X is an oxygen atom.

6. The active energy ray-curable composition according to claim 1, wherein in formula (1), n is 1, and the monovalent organic group represented by R is an alkyl group, an alkoxyalkyl group, a cycloalkyl group, an aryl group, or an aralkyl group; or n is 2, and the divalent organic group represented by R is an alkylene group, an alkylene-oxyalkylene group, an alkylene-poly(oxyalkylene) group, a cycloalkylene group, an arylene group, or a divalent group in which two or more groups selected from the group consisting of these divalent groups are bonded.

7. The active energy ray-curable composition according to claim 1, wherein in formula (1), n is 1, and the monovalent organic group represented by R is an alkyl group.

8. The active energy ray-curable composition according to claim 1, wherein in formula (1), when n is 1, the compound in which EWG and R are bonded is represented by formula (1a):

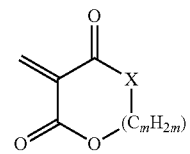

wherein m represents an integer of 1 to 10, and X is as defined above.

9. The active energy ray-curable composition according to claim 1, wherein the compound represented by formula (1) is at least one member selected from the group consisting of dialkyl 2-methylenemalonate, alkyl 2-acylacrylate, alkyl 2-cyanoacrylate, and a 5-methylene-1,3-dioxane-4,6-dione compound.

10. The active energy ray-curable composition according to claim 1, wherein in formula (2), ring A is a benzene ring that may be substituted.

11. The active energy ray-curable composition according to claim 1, wherein in formula (2), $R^1$ and $R^2$ are the same or different and each represents an alkyl group; or $R^1$ and $R^2$ are bonded to each other to form, together with an adjacent nitrogen atom, one ring selected from the group consisting of an aziridine ring, an azetidine ring, a pyrrolidine ring, a piperidine ring, a morpholine ring, an imidazole ring, a pyrazole ring, and a 1,2,3,4-tetrahydroisoquinoline ring; and the ring may be substituted.

12. The active energy ray-curable composition according to claim 1, for use in a coating agent, a printing ink, a photoresist, an adhesive, or a sealant.

13. A method for producing the active energy ray-curable composition according to claim 1, the method comprising mixing an anionically polymerizable compound represented by formula (1) and a photobase generator compound represented by formula (2).

14. A method for producing a cured product, the method comprising irradiating an active energy ray-curable composition with an active energy ray, the active energy ray-curable composition comprising:

an anionically polymerizable compound represented by formula (1):

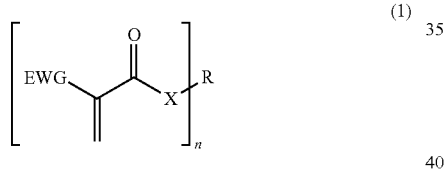

(1)

wherein EWG represents an electron-withdrawing group, X represents a single bond or an oxygen atom (—O—), R represents an n-valent organic group, and n represents an integer of 1 to 6; when n is an integer of 2 to 6, the respective EWG and the respective X may be the same or different; and when n is 1, EWG and R may be bonded; and a photobase generator compound represented by formula (2):

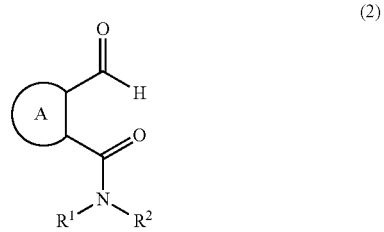

(2)

wherein ring A represents an aromatic ring that may be substituted or a heteroaromatic ring that may be substituted; $R^1$ and $R^2$ are the same or different and each represents a hydrogen atom or an alkyl group; $R^1$ and $R^2$ may be bonded to each other to form a ring together with an adjacent nitrogen atom; and the ring may be substituted.

15. A cured product obtained by the production method according to claim 14.

* * * * *